C. W. CLAPP.
CLEVIS ATTACHMENT FOR PLOWS.
APPLICATION FILED NOV. 4, 1913.
1,095,549.
Patented May 5, 1914.
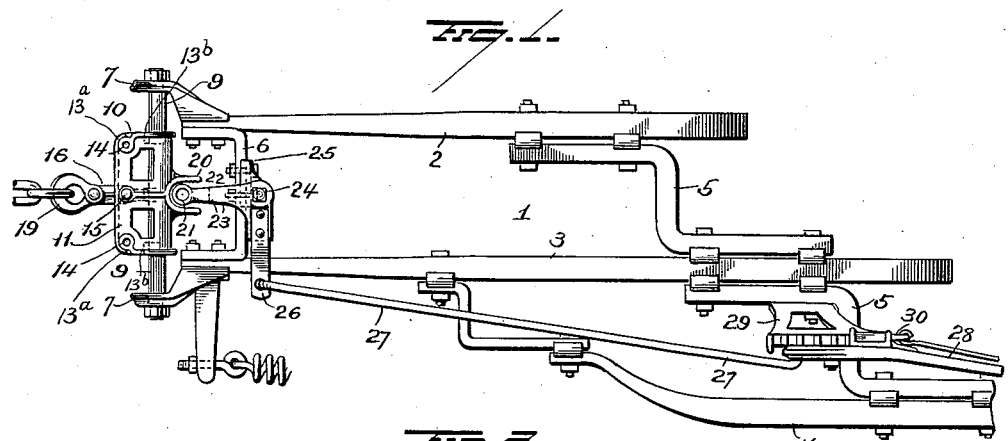
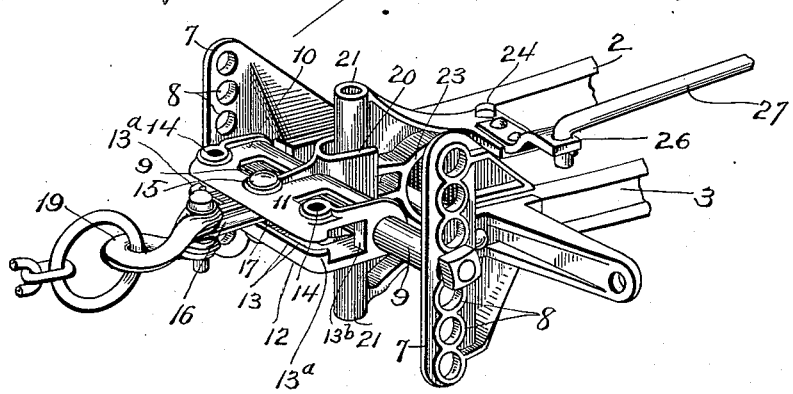
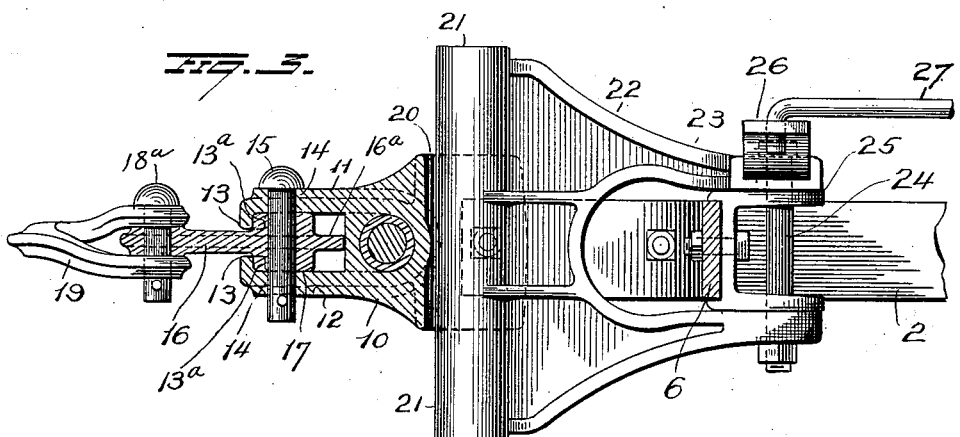
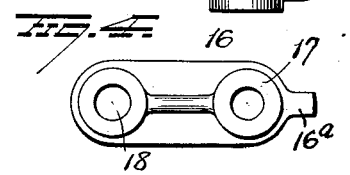
WITNESSES
E. A. Nottingham
G. F. Downing
INVENTOR
C. W. Clapp
By H. A. Seymour
Attorney
COLUMBIA PLANOGRAPH CO., WASHINGTON, D. C.

UNITED STATES PATENT OFFICE.

CHARLES W. CLAPP, OF SOUTH BEND, INDIANA, ASSIGNOR TO OLIVER CHILLED PLOW WORKS, OF SOUTH BEND, INDIANA.

CLEVIS ATTACHMENT FOR PLOWS.

1,095,549.  Specification of Letters Patent.  Patented May 5, 1914.

Application filed November 4, 1913. Serial No. 799,158.

*To all whom it may concern:*

Be it known that I, CHARLES W. CLAPP, of South Bend, in the county of St. Joseph and State of Indiana, have invented certain new and useful Improvements in Clevis Attachments for Plows; and I do hereby declare the following to be a full, clear, and exact description of the invention, such as will enable others skilled in the art to which it appertains to make and use the same.

This invention relates to improvements in clevis attachments and more particularly to such as are adaptable for use with plows,— one object of the invention being to provide a clevis structure capable of a wide or extended range of adjustment at right angles to the direction of travel and while there is strain on the draft devices.

A further object is to so construct a clevis attachment that the same may be easily and quickly adjusted while the plow is in motion.

A further object is to construct the clevis attachment in such manner that desired horizontal adjustments may be effected without the necessity of detaching the draft animals and without separating the parts of said clevis attachment.

With these and other objects in view, the invention consists in certain novel features of construction and combinations of parts as hereinafter set forth and pointed out in the claims.

In the accompanying drawings: Figure 1 is a plan view showing the application of my improvements; Fig. 2 is a perspective view of the clevis devices; Fig. 3 is an enlarged sectional view of the same, partly in elevation, and Fig. 4 is an enlarged detail view of the adjustable draft link.

1 represents a gang plow structure which may comprise a plurality of plow beams 2, 3, 4 suitably spaced apart by means of brackets 5. The forward ends of the beams 2—3 are connected by an interposed cross bar 6, and to said forward ends of the beams 2—3, vertically disposed, side clevis plates 7—7 are rigidly secured and each made with a vertical series of openings 8. A horizontal rod 9 is disposed between the side clevis plates and is adjustably secured thereto at any of the series of openings 8.

A horizontally-disposed clevis 10 is mounted to slide on the rod 9. This clevis is made in the form of an open frame comprising top and bottom members 11—12 spaced apart and connected along the rear edge,—in proximity to which latter, openings are provided whereby the clevis frame is mounted and guided on the rod 9. The front edges of the members of the clevis frame 10 are separated from each other and each of said edges is made with a flange 13 slightly curved at its respective ends, as at 13ª, for a purpose hereinafter explained. The respective members 11—12 of the clevis frame are made with pairs of alining holes 14 for the accommodation of a pivot pin 15, whereby a draft link 16 may be attached to the clevis frame at any one of several positions thereon. The draft link 16 is provided at one end with a perforated boss 17 which enters between the clevis frame members to receive the pivot pin and the portions of said boss which project above and below the body of the link are adapted to bear against the flanges 13 of the clevis frame members. The link 16 is provided near its free forward end with a hole 18 for the reception of a pin 18ª, by means of which, a hitching device or clevis 19 is attached to said link. By means of the construction above described, adjustment of the draft link from one position to another on the clevis frame 10, may be readily effected without removing the link from the clevis or even stopping the progress of the plow. It is evident that when the pin 15 is removed, engagement of the boss 17 of link 16 with the flanges 11—12 of the clevis frame will prevent disengagement of said link from the latter, and that said link may be readily slid from one position to another on the clevis frame and secured at any desired adjustment by insertion of the pin 15.

The clevis link 16 is provided with a toe 16ª which, when the link is moved to one end or the other of the clevis frame so that its boss will engage the curved portions 13ª of the flanges 13, said toe will engage the adjacent web portion 13ᵇ of the frame and thus prevent escape of the link from the clevis frame,—it being necessary, to permit removal of the link, to turn the latter until the toe 16ª shall be out of line with the adjacent web portion of the clevis frame.

The clevis frame 10 is formed with a rearwardly projecting yoke 20. This yoke is vertically disposed and approximately U-shaped to receive the elongated portion 21 of a bell-crank lever 22. The elongated portion 21 of this lever may be made tubular and the body portion of said lever is bifurcated, as at 23, to embrace the cross bar 6. The arms formed by the bifurcating of the lever are pivotally attached, by means of a vertical pivot pin 24, to a bracket 25 secured to the cross bar 6. The short arm of the bell-crank 22 is provided with a lateral extension 26 (which may be bolted or riveted thereto) and to this lateral extension of the bell-crank arm, one end of a rod or pitman 27 is attached. The outer end of the rod or pitman 27 is connected with an operating lever 28 mounted on the plow frame within convenient reach of the operator. The lever 28 is pivotally attached to a notched segment 29 secured to the plow frame and is provided with a detent 30 to engage said notched segment.

It will be seen that by operating the lever 28, motion will be imparted, through the rod or pitman 27 and the bell-crank 22, and yoke 20, to the clevis frame 10 for sliding the latter on the rod 9 and thus effect lateral adjustment of said clevis frame between the side clevis plates 7, 7. By locking the lever 28 to the segment 29, the clevis frame 10 may be secured at any desired adjustment.

By provision of the devices above described for shifting the clevis frame 10 and by connecting the clevis link 16 with the clevis frame in the manner hereinbefore explained, very wide ranges of horizontal clevis adjustments are afforded, without the necessity of dismembering the structure or even detaching the draft animals.

Various slight changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. The combination with a plow frame, side clevis plates and a rod disposed between said clevis plates, of a horizontal clevis mounted to slide on said rod, said clevis provided with a rearwardly projecting yoke, a bell-crank mounted on the plow frame and having a vertical part engaging said yoke, an operating lever, and means connecting said operating lever with the bell-crank.

2. The combination with a plow frame, side clevis plates and a rod disposed between said side clevis plates of a horizontal clevis mounted to slide on said rod and having a flange at its forward edge, means for sliding and locking said horizontal clevis and engaging the flange at the forward edge thereof, and a clevis link slidable on said horizontal clevis, and means for securing said clevis link at different adjustments on said horizontal clevis.

3. The combination with a plow frame, side clevis plates and a rod between said side clevis plates, of a horizontal clevis mounted to slide on said rod, means for securing said clevis at different adjustments on the rod, a draft link, means for securing said draft link at different adjustments on the horizontal clevis between the side clevis plates, a boss on said link, and flanges on the horizontal clevis to be engaged by said boss.

4. The combination with a plow frame, of a horizontal clevis comprising superimposed members connected at their rear edges and free at their forward edges, said forward edges having flanges, a draft link having one end disposed between the superimposed clevis members and provided with a perforated boss to engage the flanges of said clevis members, means for securing said link at different adjustments, means for connecting said horizontal clevis with the plow frame, and means for adjusting said horizontal clevis at right angles to the direction of travel of the plow.

5. The combination of a clevis frame comprising superimposed members having flanges at their free edges, the ends of said flanges being curved, of a link having a boss disposed between said clevis frame members behind said flanges, said link having a toe to engage parts of the clevis frame adjacent to the ends of the latter.

In testimony whereof, I have signed this specification in the presence of two subscribing witnesses.

CHARLES W. CLAPP.

Witnesses:
S. A. CRESSY,
C. A. WEBSTER.

---

Copies of this patent may be obtained for five cents each, by addressing the "Commissioner of Patents, Washington, D. C."